July 12, 1960  J. MARTIN  2,944,774
EJECTION SEATS FOR AIRCRAFT
Filed March 25, 1958  5 Sheets-Sheet 1

Inventor
James Martin
By Kurt Kelman
AGENT

July 12, 1960   J. MARTIN   2,944,774
EJECTION SEATS FOR AIRCRAFT
Filed March 25, 1958   5 Sheets-Sheet 2

Inventor
James Martin
By Kurt Kelman
AGENT

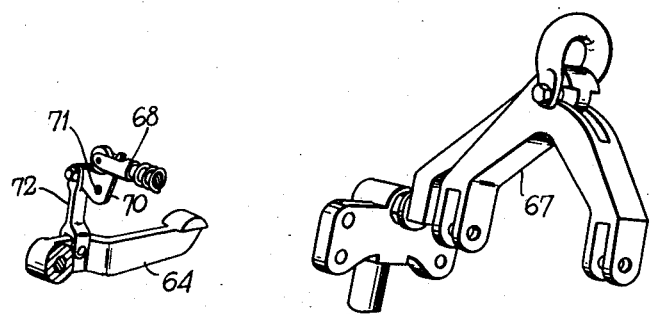
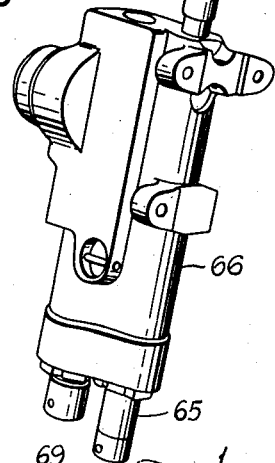
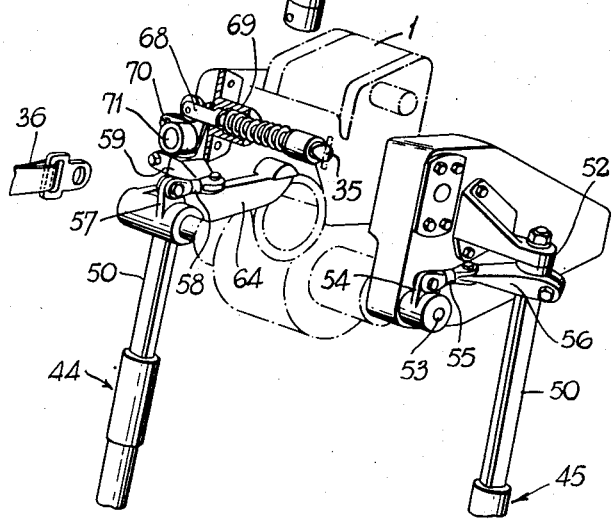

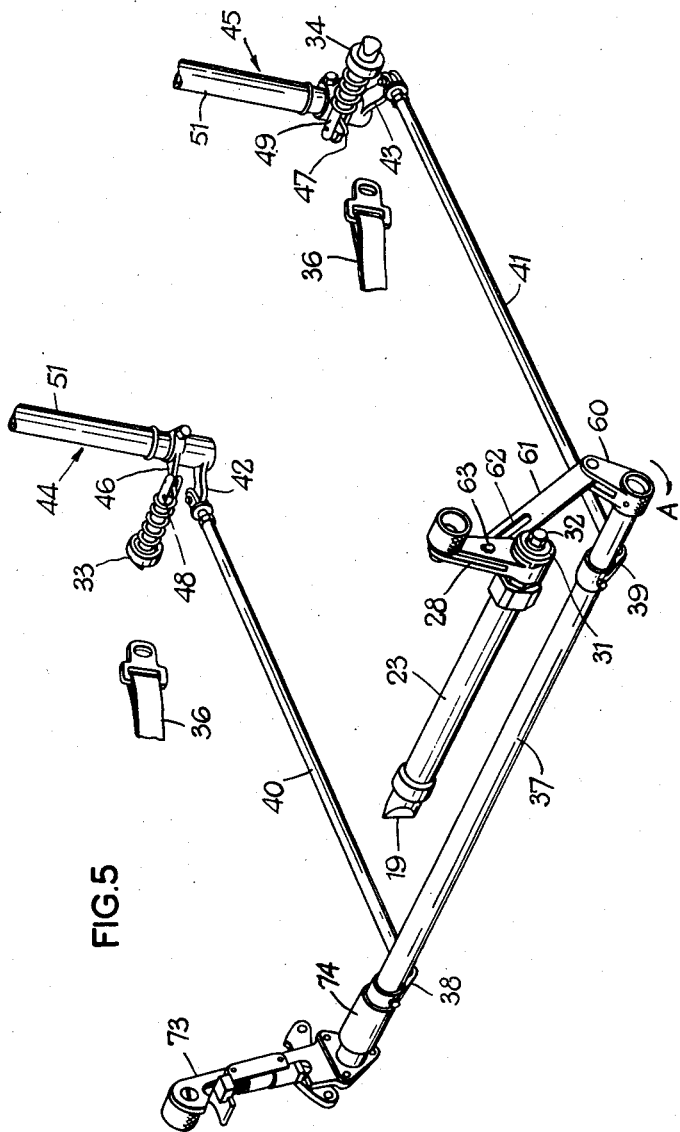

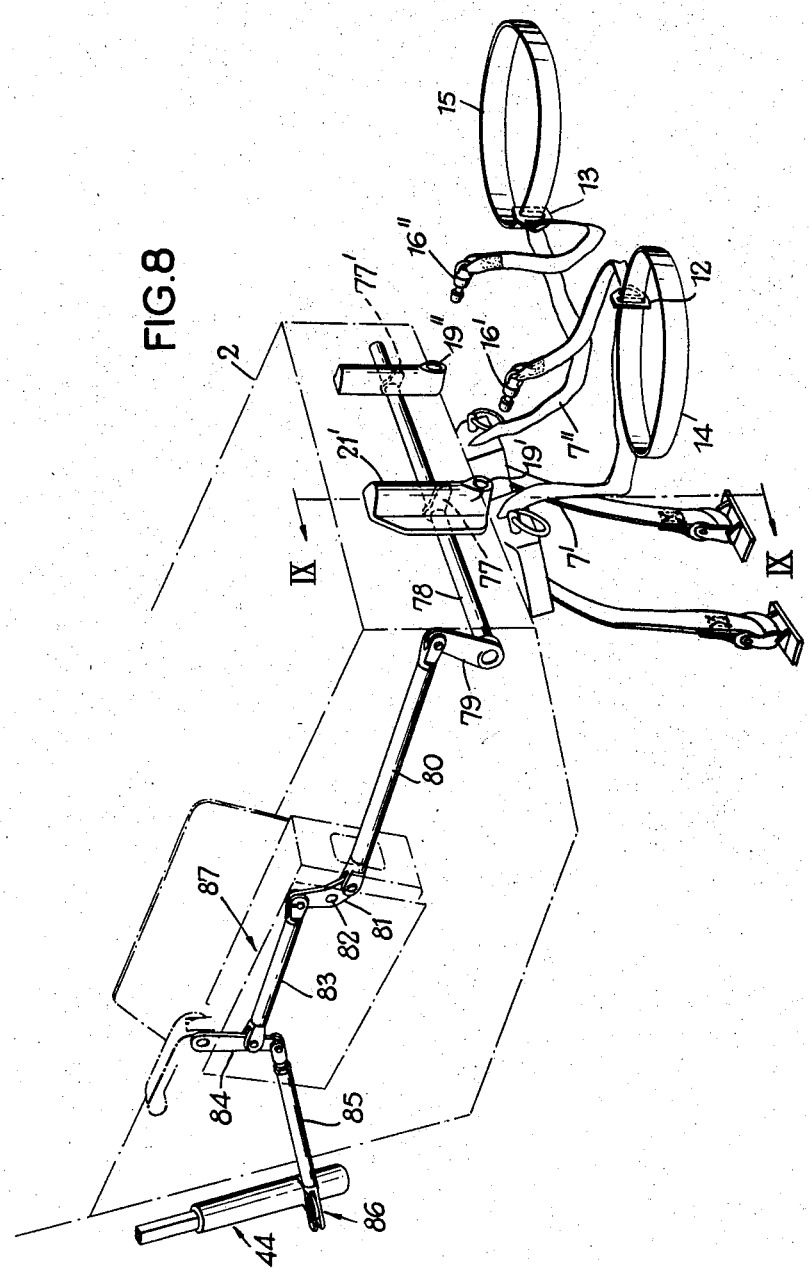

United States Patent Office 2,944,774
Patented July 12, 1960

2,944,774

EJECTION SEATS FOR AIRCRAFT

James Martin, Southlands Manor, Southlands Road, Denham, near Uxbridge, Middlesex, England Filed Mar. 25, 1958, Ser. No. 723,794

Claims priority, application Great Britain Mar. 29, 1957

8 Claims. (Cl. 244—122)

This invention concerns improvements in or relating to ejection seats for aircraft and has more particular reference to such ejection seats when provided with leg restraining means of the kind which, whilst leaving the legs of the airman using the seat relatively free during normal flight, are caused, when the seat is ejected from the aircraft, to hold the airman's legs firmly to avoid their violent displacement by powerful air blasts, the airman's legs being released, however, preparatory to his leaving the seat after ejection of the latter. Such a leg restraining arrangement is described and claimed in U.S. Patent No. 2,836,382, dated May 27, 1958.

In arrangements there described, the airman's legs are restrained by flexible lines which are passed freely through D-rings on straps fitted around the airman's legs or through loops on his flying suit, these lines being connected at one part to the aircraft and passing from this connection through snubbing boxes mounted on the seat and which permit movement of the lines therethrough only towards the said connection, whilst the other or seat ends of the lines are attached to a quick release box forming part of the safety or seat harness for holding the airman in the ejection seat and which quick release box is additional to, and independent of, the quick release box of the airman's parachute harness.

On the operation of the quick release box of the seat harness, the latter may be released simultaneously with the disconnection of the leg restraining lines from such harness, so as thus to free the airman from the ejection seat with his parachute harness undisturbed.

In some cases, however, it is desirable to combine the seat harness with the airman's parachute harness and to arrange for the seat harness to be detachably connected to the seat by releasable locks on the seat, the said seat harness quick release box being dispensed with, as described, for example, in U.S. Patent No. 2,655,329.

When such a combined seat and parachute harness arrangement is used, the method of releasably anchoring the seat ends of the leg restraining lines to the quick release box of the seat harness is not available and it is, therefore, an object of this invention to provide for the seat end of the or each leg restraining line, a quickly connectible and releasable anchorage separate from the seat harness and its securing means. Further objects of the invention are to provide a leg restraining arrangement which can be released manually in normal circumstances, as when the airman wishes to leave the ejection seat, and to provide means whereby the seat harness and leg restraining means can be released from the seat simultaneously and automatically in an emergency. A still further object of the invention is to provide an over-riding control means whereby, in the event of failure of the said automatic means to operate or for any other reason, the airman can effect the simultaneous release of the leg restraining means and the seat harness from the seat after ejection of the latter from the aircraft. Yet another object of the invention is to provide a simplified leg restraining system.

Whilst not limited in its application thereto, the present invention is particularly suitable for use with an ejection seat of the known type made by the Martin-Baker Aircraft Co., Ltd. and wherein is provided (as described in U.S. Patent No. 2,708,083) a time delay mechanism comprising a spring-urged drogue shackle release plunger which is normally retained in a "cocked" or loaded condition and which maintains in a locked condition a releasable shackle connected to the top of the seat frame and also to the cable of a drogue parachute, this shackle being, after a short lapse of time after the ejection of the seat, automatically released to free the said drogue cable from the seat thereby to enable this cable to withdraw and deploy the airman's parachute, the release of said shackle being achieved by the operation of the said plunger which also effects the automatic unlocking of the hereinbefore mentioned seat harness locks.

According to this invention there is provided in an ejection seat for an aircraft and having locks for securing seat harness releasably to the seat, leg restraining means comprising a line, means for making a free running connection between the said line and an airman's leg, a snubbing box on the ejection seat and through which said line is passed, means for connecting the said line to the aircraft independently of said seat and at a position beyond that end of the snubbing box remote from the said free running connection means, retaining means on the ejection seat and separate from the said seat harness locks for releasably attaching to the ejection seat that end of the said line most remote from said connecting means, the said snubbing box being adapted to permit said line to pass freely therethrough only in a direction towards said connecting means, so that, when the ejection seat is launched from the aircraft, the said line is first drawn taut throughout its length thereby to cause the part of the line between the snubbing box and the said retaining means to apply restraint to the airman's leg, whereafter the said line is automatically detached from the aircraft at a position between the latter and said snubbing box without relaxing its restraint on the airman's leg; and means for releasing the said retaining means to free therefrom that end of the said line held thereby and thus to remove said leg restraint as and when required, e.g. when the airman seeks to leave the ejection seat either in normal circumstances or after ejection and when abandoning the seat in mid-air.

Further features of the invention will become apparent from the following description of certain embodiments of the same and the appended claims, taken in conjunction with the accompanying drawings, in which:

Figure 4 is an enlarged fragmentary perspective view of the time delay and automatically operating mechanism for releasing the retaining means of the leg restraining means according to the invention;

Figure 5 illustrates the lower part of the leg restraining means release mechanism which is operable from the mechanism shown in Figure 2;

Figure 6 is a fragmentary perspective view showing the manner in which the shoulder harness lock is operated;

Figure 8 is a fragmentary perspective view of a modified arrangement in accordance with the invention, making use of two leg restraining lines instead of one and showing a modified method of releasing the retaining latches for such leg restraining means.

Figure 1:
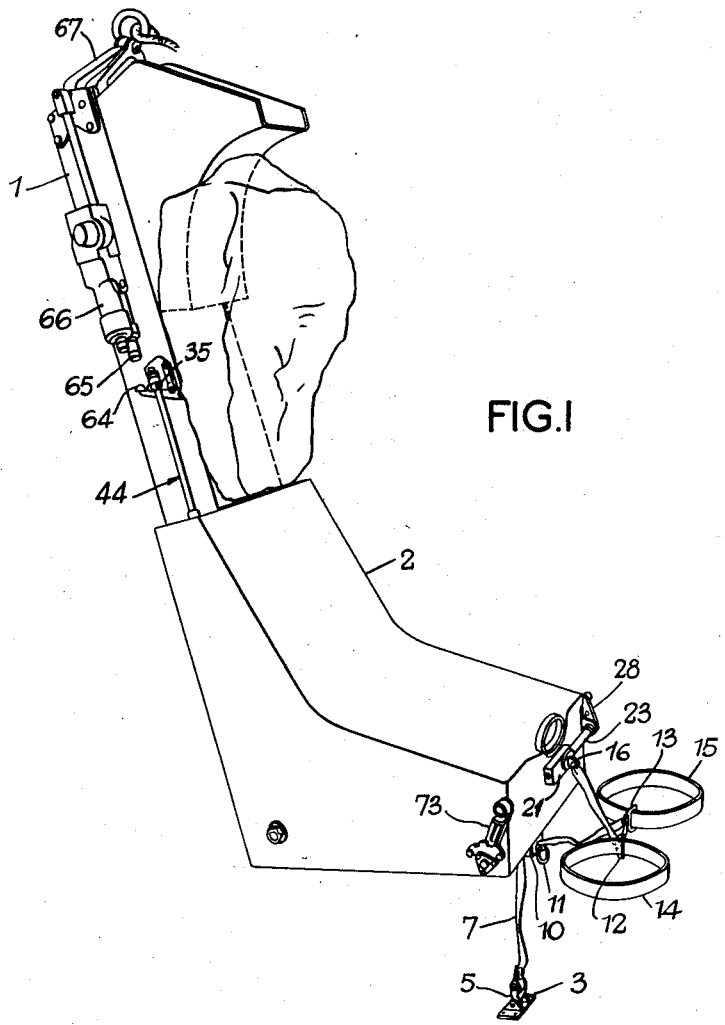
Figure 1 is a diagrammatical perspective view of an ejection seat for aircraft having this invention applied thereto.
Figure 3:
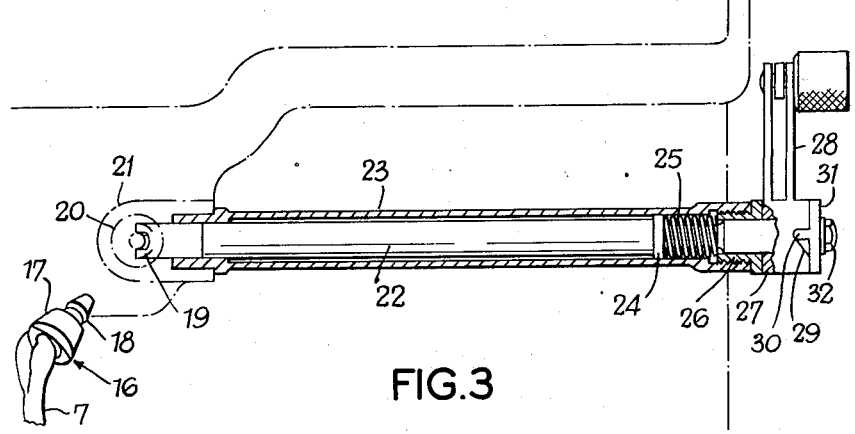
Figure 3 is a vertical part-sectional elevation of the retaining means for the leg restraining means shown in Figures 1 and 2 but drawn to an enlarged scale.

In the embodiment of the invention shown in the drawings, 1 is the frame of an ejection seat (shown in chain-dotted lines in Figs. 2, 3, 4 and 8) of the kind manufactured by the Martin-Baker Aircraft Co. Ltd., upon which is mounted a seat bucket 2 adapted for adjustment up and down on the frame. By arranging for the seat bucket to be adjustable on the seat frame the position of the seat bucket upon the frame can be varied to bring any particular airman into such a position that his head is properly located with respect to the head rest of the ejection seat and the line of vision from the aircraft. Moreover, where the seat is of the kind having a protective face screen, such as is described in U.S. Patent No. 2,467,763, for example, the adjustability of the seat enables the airman to be accommodated in a position which renders the handle of the face screen, which controls the ejection of the seat, readily available to him.

On the floor of the aircraft, i.e. an aircraft portion which is independent of the seat, is fixed a bracket 3 to which is attached, by a pin 4, a forked roller bracket 5 in which is releasably mounted a roller 6 having the lower end of a nylon leg restraining line or cord 7 secured thereto (see Fig. 2), the elements 3, 4, 5, 6 constituting a means for releasably connecting this one end of the line to the floor. The roller 6 is furnished with short conical trunnions 8 engaging in holes in the sides of the roller bracket 5 from which the roller is automatically released when the tension in the line 7 exceeds a predetermined value during the ejection of the seat 1 from the aircraft.

The line 7 passes upwardly from the floor of the cockpit and over a roller 9 and then through a snubbing box 10 secured substantially horizontally on the underside of the seat bucket 2, such snubbing box permitting the line to be drawn downwardly (i.e. in a direction away from the seat) but not in the opposite direction and conveniently being of known form and generally similar to that described with reference to Figures 8 and 9 of United States Patent No. 2,836,382. The snubbing box is provided with a release pin 11 by which the line 7 can be manually freed for movement, when desired, in either endwise direction through the box.

The line 7 passes from the snubbing box 10 successively through connection members constituted by D-rings or loops 12 and 13 respectively provided on leg or calf straps 14 and 15 adapted to be fastened around the legs of the airman below the knees and which leg restraining members would normally be applied by the airman before entering the aircraft; the loops 12 and 13 constitute a free running connection with the leg straps which form a leg restraining means.

The upper end of the leg restraining line 7 is furnished with a terminal member in the form of a plug 16 having an eye for the permanent attachment of the line thereto. As may be seen in Fig. 3, plug 16 also has a portion 17 of frusto-conical form and provided with an annular groove between its ends to furnish a shoulder 18 for engagement with a forked latch head 19 adapted to enter said annular groove for releasably retaining the terminal plug 16 in a matching frusto-conical socket 20 provided for its reception in a latch housing 21 and which socket serves firmly to position the said plug in the housing when inserted therein, thus constituting a means for releasably attaching the other end of line 7 to the ejection seat.

The latch head 19 is carried on the inner end of a latch rod 22 slidable axially in a guide tube or housing 23 arranged horizontally along the front part of the seat pan and carried thereby. The rod 22 is furnished with a collar 24 against which abuts one end of a compression spring 25 engaging at its other end against the inner end of a bush 26 screwed into the outer end of the guide tube 23 and forming a journal for the outer part of the rod 22 which projects beyond the outer end of the bush. The latch head 19 is thus constantly urged into its locking position and when the plug 16 is inserted in the socket 20 the latch head snaps into locking engagement with the plug.

On the outwardly projecting end portion of the latch rod 22 is mounted the boss 27 of a latch actuating crank arm 28, this boss having diametrically oppositely disposed cam recesses 29 in its outer face for co-operation with a diametrical cam rib 30 on a cam disc 31 secured by a stud 32 on the outer end of the latch rod 22, this cam disc being urged into close contact with the boss 27 of the lever 28 by the spring 25. The cam rib 30 keys the cam disc 31 to the latch rod 22—which is non-rotatable in the guide 23—so that, when the lever 28 is rotated about the latch rod, the inter-action of the cam rib 30 with the cam recesses 29 causes axial withdrawal of the latch rod 22 against the action of the spring 25 and consequently effects the release of the plug 16 from the latch housing 21 so that the leg restraining line 7 can, if desired, be withdrawn downwardly out of the loops or D-rings 12 and 13 previously referred to.

In normal flight, the part of the leg restraining line 7 located between the snubbing box 10 and the latch housing 21 will be slack so that the airman has complete freedom of leg movement, but when the ejection seat is launched from the aircraft, the leg restraining line will be drawn downwardly through the snubbing box so that the slack will be taken up and the airman's legs brought firmly up against the front of the seat bucket in order to confine and hold them firmly and restrain their violent displacement when the ejection seat enters powerful airstreams on leaving the aircraft. On the continued movement of the ejection seat from the aircraft, the roller 6 will be detached from the roller bracket 5 completely to free the line 7 from the aircraft but, because of the action of the snubbing box, the part of the line between such box and the latch housing will remain taut and not relax its restraint on the airman's legs.

When the airman wishes to leave the ejection seat in normal circumstances, leaving his parachute and the combined parachute and seat harness attached to the seat, all he has to do is to release the quick release box of such harness and to turn the lever 28 towards him thereby to withdraw the latch head 19 from the terminal plug 16 of the leg restraining line 7 thereby to release such plug, and thereafter unthread the line 7 from the D-rings 12 and 13 on his calf straps 14 and 15.

It is, however, very desirable that the terminal plug 16 of the leg restraining line 7 should, in an emergency, be releasable from the socket 20 simultaneously with the release of the locks 33, 34 and 35 holding the combined seat and parachute harness 36 and the airman in the ejection seat. Only small fragments of the harness 36 are shown in the drawings as this harness itself forms no part of this invention, but the harness locks are illustrated in Figs. 4 and 5. The locks 33 and 34 are located in the rear of, and one at each side of, the seat bucket 2, whilst the lock 35 is arranged on the seat frame centrally thereof and at about shoulder height. It is also very desirable that the simultaneous release of the terminal plug 16 of the leg restraining line 7 and of the seat harness should be achievable both automatically and by manual over-ride control means.

Thus, in the embodiment of the invention shown in Fig. 5, a leg line and harness lock releasing shaft 37 is arranged across the front of the seat below and parallel to the latch rod 22, this shaft being of tubular form and journalled for rotation in appropriate bearings (not shown) on the seat bucket. On this shaft are fixed two crank arms 38 and 39, of which the free ends are connected to rearwardly extending links 40 and 41. The rear ends of these links are respectively connected to the outer ends of crank arms 42 and 43 fixed to, and radiating from, the lower end portions 51 of rotatable torque shafts 44 and 45. The portions 51 of the torque shafts also carry further crank arms 46 and 47 co-operating with spring-urged locking plungers 48 and 49 of the seat harness locks 33 and 34.

The torque shafts 44 and 45 are of a telescopic character and each comprises an upper portion 50 (see Fig. 4) of non-circular, e.g. square, cross-sectional form fitting slidably into a bore of corresponding cross-sectional form in the lower portion 51 of the shaft. This lower portion 51 of each torque shaft is journalled in the seat bucket whilst the upper portion 50 of each torque shaft is journalled in a bracket 52 on the seat frame 1 or a part fixed thereto. The lower portions 51 of the torque shafts are capable of rotation in their journals in the seat bucket but are restrained against axial movement with respect to such seat bucket, whilst the upper portions of the torque shafts are rotatable in the brackets 52 but are restrained against axial movement relatively to these brackets.

As seen Fig. 4, there is one of the telescopic torque shafts running up each side of the frame 1 of the seat and between these two shafts, and journalled on the seat frame, extends a horizontal actuating shaft 53 to one end of which is fixed a crank arm 54 movable in a vertical plane and connected by a link 55 to a further crank arm 56 fixed upon the upper portion 50 of the adjacent torque shaft 45 so as to turn with this shaft and in a horizontal plane.

At the other end of the actuating shaft 53 is fixed a further crank arm 57 similar to the arm 54 and which is connected by a link 58 to a crank arm 59 fixed upon the upper end of the upper portion 50 of the torque shaft 44, the crank arm 59 being similar to the crank arm 56. Thus, when the actuating shaft 53 is rotated, both torque shafts 44 and 45 are similarly rotated about their axes simultaneously, thereby to operate the crank arms 46 and 47 and 42 and 43 for respectively releasing the harness locks 33 and 34 and rotating the cross shaft 37.

When the torque shafts 44 and 45 are rotated in a direction to release the seat harness locks, the shaft 37 is rotated in the direction of arrow A in Figure 5 and this causes a crank arm 60 fixed upon one end of the shaft to operate the lever 28 of the leg release latch mechanism in a direction such as to withdraw the latch head 19 and free the terminal plug 16 of the leg restraining line 7, the crank arm 60 being connected to the lever 28 by a link 61 having a slot 62 engaged by a pin 63 in the lever 28. The pin and slot connection 62, 63 permits the lever 28 to be manually operated to release the leg restraining line plug 16 without effecting the release of the seat harness locks, but when the shaft 37 is rotated from the torque shafts 44 and 45 (or a manual over-riding control lever subsequently described), the link 61 also operates on the lever 28 to withdraw the latch 19 of the leg restraining mechanism as above described.

Fixed on the actuating shaft 53, and adjoining the crank arm 57 and conveniently carried by the same boss is a harness lock releasing lever 64 which is adapted, after launching of the ejection seat from an aircraft in an emergency, to be forcibly depressed by a plunger 65 which, although it could be of other form and operated in other ways, e.g. by the firing of an explosive cartridge, preferably forms part of a time delay mechanism 66 of the form described in U.S. Patent No. 2,708,083 and which co-operates with a scissor shackle mechanism 67 (also described in the last-named patent) at the top of the seat frame to release a drogue parachute and thereby to initiate, during said launching of the ejection seat, the operation of various further mechanisms with which this invention is not directly concerned.

The seat harness lock 35 includes a plunger 68 slidably mounted in a journal 69 on the seat frame and withdrawable against the action of a compression spring by means of one arm of a bell crank lever 70 pivoted to the seat frame at 71 and having its other arm connected to a link 72 also connected to the actuating lever 64 at an appropriate position thereon.

The shackle release plunger 65 is normally retained in the cocked position shown in Figure 4 but, on release, descends forcibly and engages the tip of the lever 64, thereby depressing the same and rotating the actuating shaft 53 which automatically effects the release of the seat harness locks 33, 34 and 35 and the release of the leg restraining line retaining latch 19.

The harness lock control mechanism comprising the hereinbefore mentioned telescopic shafts 44 and 45 form the subject of my co-pending patent application Serial No. 723,705, of even date and no claim is made herein to that mechanism per se.

A manually operable over-ride control lever 73 is also provided on the ejection seat bucket 2 whereby the seat harness locks 33, 34 and 35, and the leg restraining line retaining latch 19 may be released in an emergency, e.g. in the event of failure of the automatic mechanism to effect these release operations for any cause whatsoever. As shown in Figs. 5 and 7, the manual over-ride lever is radially carried by an elongated tubular boss 74 mounted around that end of the shaft 37 remote from the crank arm 60, and a lost motion device, comprising a pin 75 on the shaft 37 and a slot 76 in the boss 74, is provided for enabling the shaft 37 to rotate to a limited extent without the manual control lever 73 and under the action of the leg restraining line retaining latch-operating lever 28 during the manual or automatic operation of the latter, the lever 73 being adapted, however, after an initial short ineffective movement, to actuate the shaft 37 to produce the simultaneous release of the latch 19 and the harness locks 33, 34 and 35.

Figures 7, 9:
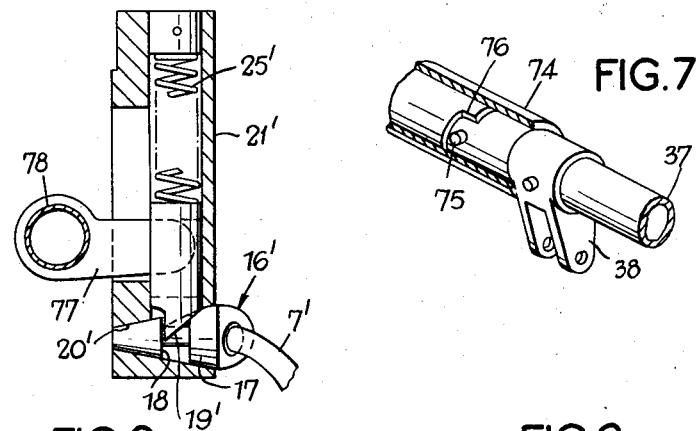
Figure 7 is a part-sectional fragmentary perspective view showing a detail of the manual over-ride control lever of the mechanism shown in Figures 1 and 5.
Figure 9 is a vertical section on the line IX—IX of Figure 8.
Figure 2:
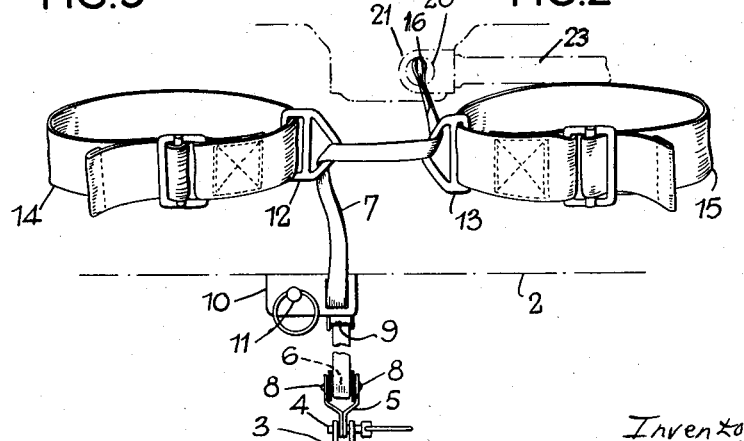
Figure 2 is a front perspective view of leg restraining means constructed in accordance with this invention.

Figure 9 shows a modified arrangement wherein is illustrated a variant 19' of the latch 19 for retaining the plug of the leg restraining line 7. In this case, the latch 19' is slidable in a vertical bore in a housing 21', of which the plug receiving socket 20' is arranged perpendicularly to the front of the seat bucket and so that its axis intersects the axis of the bore of the housing.

The latch 19' is urged downwardly by a strong compression spring 25' and, as shown in Fig. 8, the latch is adapted to be withdrawn from the co-operating leg restraining line terminal plug by a radial lever 77 fixed upon a shaft 78 journalled in the front of the seat bucket and rotatable by a lever 79 fixed upon such shaft, this lever 79 being operable from one or both of the torque shafts 44 and 45 (previously referred to) by a linkage which may conveniently be similar to that shown in Figure 5. However, as shown in an alternative construction illustrated in Figure 8, the said linkage may comprise a link 80 connected to one end of a double-ended lever 81 pivoted at 82 upon the seat bucket 2 and in turn connected by a link 83 to a lever 84 connected by a link 85 through the medium of a pin and slot connection 86 to the lower part of the torque shaft 44. The lever 84 above referred to is pivotally mounted at its upper part upon the seat bucket 2 and may conveniently form part of the control mechanism associated with a multi-service connector 87 forming the subject of my co-pending application Serial No. 720,759 and which provides means for simultaneously disconnecting the oxygen, air, and electrical supplies to the airman's suit, the leg restraining means and the seat harness locks but which forms no part of this invention.

Figure 8 also illustrates a modified arrangement in which, instead of only using a single leg restraining line 7 passing through the D-rings 12 and 13 of both of the calf straps 14 and 15, each such strap has its own leg restraining line, these lines being marked, in the drawing, respectively 7' and 7" and each having its own terminal plug 16', 16" and its own latch 19', 19", the second of these latches being moved in a releasing direction by a lever 77' precisely the same as the lever 77 previously described and fixed to the same shaft 78 as the latter.

I claim:

1. In an ejection seat for an aircraft comprising locks mounted on the seat for releasably securing a seat harness to the seat and means for restraining the legs of an airman: at least one line connected to said leg restraining means; means mounted on an aircraft portion which is independent of said seat for releasably connecting one end of said line to said aircraft portion; means mounted on said ejection seat and separate from said seat harness locks for releasably attaching the other end of said line to the ejection seat; means mounted on the leg restraining means for making a free running connection between said line and the leg restraining means; a snubbing box mounted on the ejection seat at a distance from said line attaching means and between the free running connection means and the connecting means for said one line end, the line passing from said other end through the free running connection means to and through said snubbing box and to said one end, the snubbing box permitting said line to pass freely therethrough only in the direction towards said connecting means; and means cooperating with said attaching means for the other line end for releasing said other end and thus to remove the leg restraint.

2. Apparatus according to claim 1, wherein the leg restraining means includes two separate restraining members, one for each leg, a single such line is provided and said free running connection means includes separate free running connection members for said single line and attached to a respective one of said two restraining members.

3. Apparatus according to claim 1, wherein the leg restraining means includes two separate restraining members, one for each leg, and two such lines are provided, an independent and separate one of said free running connection means, connecting means, attaching means and snubbing box being provided for each of said lines.

4. Apparatus according to claim 1, further comprising means manually operable independently of the release of the seat harness locks for disengaging said attaching means.

5. Apparatus according to claim 1, further comprising means for releasing said seat harness locks and operatively connected with the means for releasing the other line end whereby the release of the locks and the line may be effected simultaneously.

6. Apparatus according to claim 5, further comprising means automatically operating said lock and line releasing means at a set stage after the launching of the ejection seat from the aircraft.

7. Apparatus according to claim 6, wherein said automatic operating means comprises a plunger automatically effecting a forceful operating stroke after the launching of the ejection seat and said releasing means comprises a lever and linkage system operable by said plunger and conveying releasing movement to the locks and line attaching means.

8. Apparatus according to claim 1, further comprising an over-riding manually operable member for effecting simultaneous release of the seat harness locks and the attaching means for the other line end.

References Cited in the file of this patent

UNITED STATES PATENTS 2,754,073    Holm et al.   ------------ July 10, 1956

FOREIGN PATENTS 721,752    Great Britain   ----------- Jan. 12, 1955